(12) United States Patent
Hong et al.

(10) Patent No.: US 9,491,156 B2
(45) Date of Patent: Nov. 8, 2016

(54) CONNECTION MANAGEMENT METHOD AND SYSTEM FOR RELAYING CLIENT AND BACKEND OF SERVER ON SERVER SIDE

(71) Applicant: K-INNOVATION, Seongnam-si (KR)

(72) Inventors: Seong Bong Hong, Seongnam-si (KR); Won Min Cho, Seongnam-si (KR); Yu Ik Yim, Seongnam-si (KR)

(73) Assignee: K-INNOVATION, Seongnam-si (KR)

( * ) Notice: Subject to any disclaimer, the term of this patent is extended or adjusted under 35 U.S.C. 154(b) by 42 days.

(21) Appl. No.: 14/465,871

(22) Filed: Aug. 22, 2014

(65) Prior Publication Data

US 2015/0067788 A1    Mar. 5, 2015

(30) Foreign Application Priority Data

Sep. 4, 2013    (KR) .................. 10-2013-0105912

(51) Int. Cl.
*H04L 29/06*    (2006.01)

(52) U.S. Cl.
CPC .............. *H04L 63/08* (2013.01); *H04L 63/168* (2013.01)

(58) Field of Classification Search
CPC ..... H04L 63/08; H04L 63/102; H04L 63/10; H04L 63/168; G06F 21/6218; H04W 12/06
USPC ............................................................ 726/4
See application file for complete search history.

(56) References Cited

U.S. PATENT DOCUMENTS

| | | | |
|---|---|---|---|
| 2003/0065810 A1* | 4/2003 | Ims ..................... | H04L 67/2819 709/232 |
| 2010/0218238 A1* | 8/2010 | Mouleswaran ....... | G06F 21/335 726/4 |

FOREIGN PATENT DOCUMENTS

| KR | 1020020044823 | 6/2002 |
|---|---|---|
| KR | 10-0426399 | 4/2004 |

\* cited by examiner

*Primary Examiner* — Baotran N To
(74) *Attorney, Agent, or Firm* — H.C. Park & Associates, PLC

(57) ABSTRACT

Provided is a connection management method and system for relaying a client and a backend module of a server on a server side. A connection management method performed by a connection management system may include receiving a request message from a client device, adding an authentication tag and a service tag for a connection to the request message, verifying a right of the authentication tag and a right of the service tag using a uniform resource identifier (URI) of the request message, searching for a service corresponding to the request message using the URI, and transferring the request message to the found service.

19 Claims, 6 Drawing Sheets

CONNECTION MANAGEMENT METHOD AND SYSTEM FOR RELAYING CLIENT AND BACKEND OF SERVER ON SERVER SIDE

CROSS-REFERENCE TO RELATED APPLICATION

This application claims priority from and the benefit of Korean Patent Application No. 10-2013-0105912, filed on Sep. 4, 2013, which is hereby incorporated by reference for all purposes as if fully set forth herein.

BACKGROUND

1. Field

Embodiments of the present disclosure relate to a connection management method and system for relaying a client and a backend module of a server on a server side.

2. Discussion of the Background

The mobile Internet refers to an advanced Internet service that enables users to perform communication, dating, information search, transactions, and entertainment over the Internet while moving using mobile equipment such as smartphones or laptops. Currently, the World Wide Web has been utilized as a byword for the Internet without distinguishing the original Internet from the World Wide Web that is one service provided by the Internet. Accordingly, a mobile web may be construed as the mobile Internet.

With the recent development in mobile network technology such as the mobile Internet, large quantities of multimedia data may be transmitted at a high rate. In addition, user terminals connectable to the mobile network have been widely distributed. Accordingly, a variety of mobile content, such as searching, shopping, games, and chats, are provided to users.

However, in the related art, in order to achieve overseas expansion of a service, the service may be provided by constructing an entire server based on communication and network environments for each country, which may lead to a huge initial cost.

SUMMARY

Embodiments of the present disclosure provide a connection management method and system that may provide a service by constructing only a connection management server corresponding to a front end server for each country, and by relaying an overseas client and the domestically constructed backend server through the connection management server in the case of overseas expansion of the service.

Additional features will be set forth in the description which follows, and in part will be apparent from the description, or may be learned by practice of the disclosure.

Embodiments disclose a connection management method performed by a connection management system, the method including receiving a request message from a client, adding an authentication tag and a service tag for a connection to the request message, verifying a right of the authentication tag and a right of the service tag using a uniform resource identifier (URI) of the request message, searching for a service corresponding to the request message using the URI, and transferring the request message to the found service.

The request message may be transmitted to a server that provides the service, and a geographical difference of a national unit may be present between the location of the server and the location of the connection management system.

The verifying of the right of the authentication tag and the right of the service tag may include verifying the right of the authentication tag by comparing an authorization level of the authentication tag to an authorization level of information on a service registered to the connection management system, and verifying the right of the service tag by comparing the service tag to a service tag included in the URL.

The connection management method may further include receiving a response message from the service to which the request message is transferred, and transferring the response message to the client.

The connection management method may further include selectively logging the request message and the response message.

The request message may be authenticated at the service using the authentication tag.

Embodiments also disclose a connection management system, including at least one storage unit/storage configured to store at least one program, and at least one processor. The at least one processor may perform, according to a controller of the at least one program, a process of receiving a request message from a client, a process of adding an authentication tag and a service tag for a connection to the request message, a process of verifying a right of the authentication tag and a right of the service tag using a URI of the request message, a process of searching for a service corresponding to the request message using the URI, and a process of transferring the request message to the found service.

Embodiments also disclose a connection management system, including a verifier configured to add an authentication tag and a service tag to a request message received from a client, and to verify a right of the authentication tag and a right of the service tag using a URI of the request message, a mapper configured to map the request message and a service using the URI, and a connector configured to transfer the request message to the mapping service.

It is to be understood that both the foregoing general description and the following detailed description are exemplary and explanatory and are intended to provide further explanation of the claims.

According to embodiments of the present disclosure, in the case of overseas expansion of a service, it is possible to provide the service by constructing only a connection management server corresponding to a front end server for each country, and by relaying an overseas client and the domestically constructed backend server through the connection management server.

BRIEF DESCRIPTION OF THE DRAWINGS

The accompanying drawings, which are included to provide a further understanding of the disclosure and are incorporated in and constitute a part of this specification, illustrate embodiments of the disclosure, and together with the description serve to explain the principles of the disclosure.

DETAILED DESCRIPTION OF THE ILLUSTRATIVE EMBODIMENTS

Figure 1:
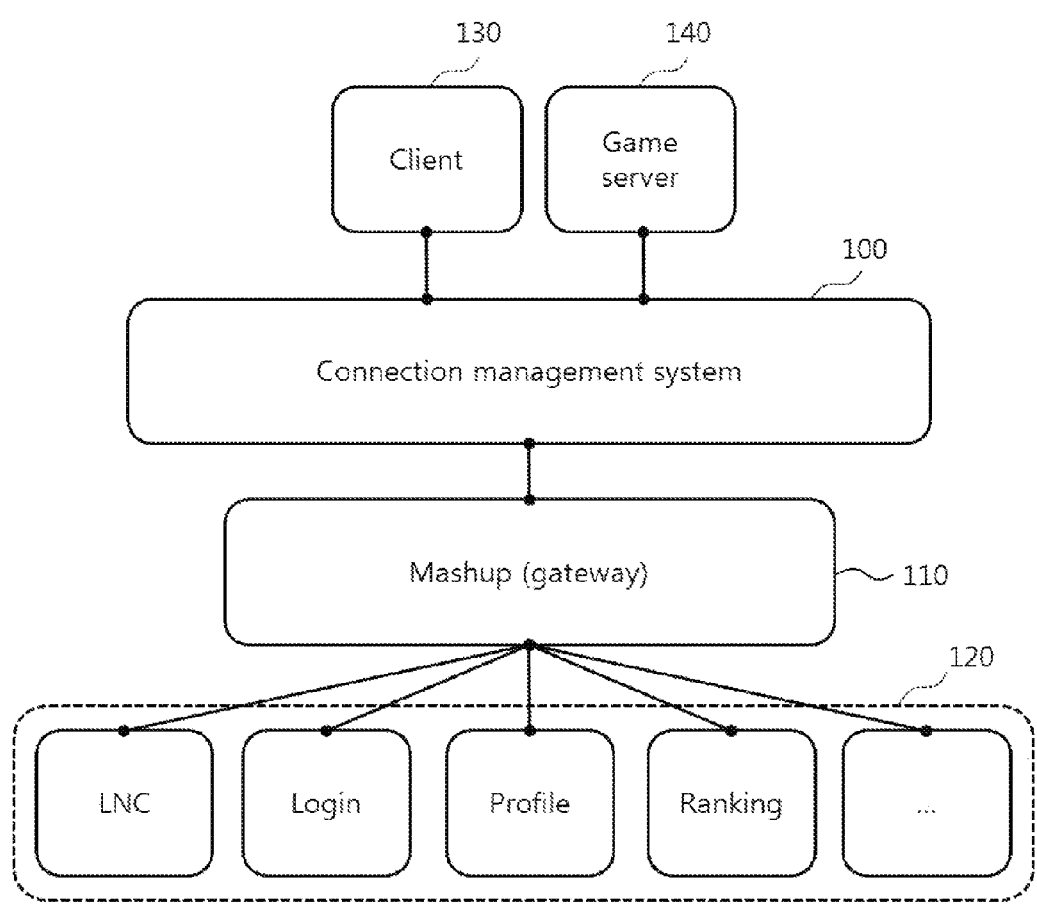
FIG. 1 illustrates an example of a connection management system according to embodiments of the present disclosure.

Embodiments of the present disclosure will be described in detail with reference to the accompanying drawings. These embodiments will be described in detail for those skilled in the art in order to practice the present disclosure. It should be appreciated that various embodiments of the present disclosure are different but do not have to be exclusive. For example, specific shapes, configurations, and characteristics described in an embodiment of the present disclosure may be implemented in another embodiment without departing from the spirit and the scope of the present disclosure. In addition, it should be understood that position and arrangement of individual components in each disclosed embodiment may be changed without departing from the spirit and the scope of the present disclosure. Therefore, a detailed description described below should not be construed as being restrictive. In addition, the scope of the present disclosure is defined only by the accompanying claims and their equivalents if appropriate. Similar reference numerals will be used to describe the same or similar functions throughout the accompanying drawings. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

The terminology used herein is for the purpose of describing embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising", when used in this specification, specify the presence of stated features, integers, steps, operations, elements and/or components, but do not preclude the presence or addition of one or more other features, integers, steps, operations, elements, components, and/or groups thereof.

Hereinafter, embodiments of the present disclosure are described in detail with reference to the accompanying drawings.

It will be understood that when an element is referred to as being "connected to" another element, it can be directly connected to the other element, or intervening elements may be present.

Figure 2:
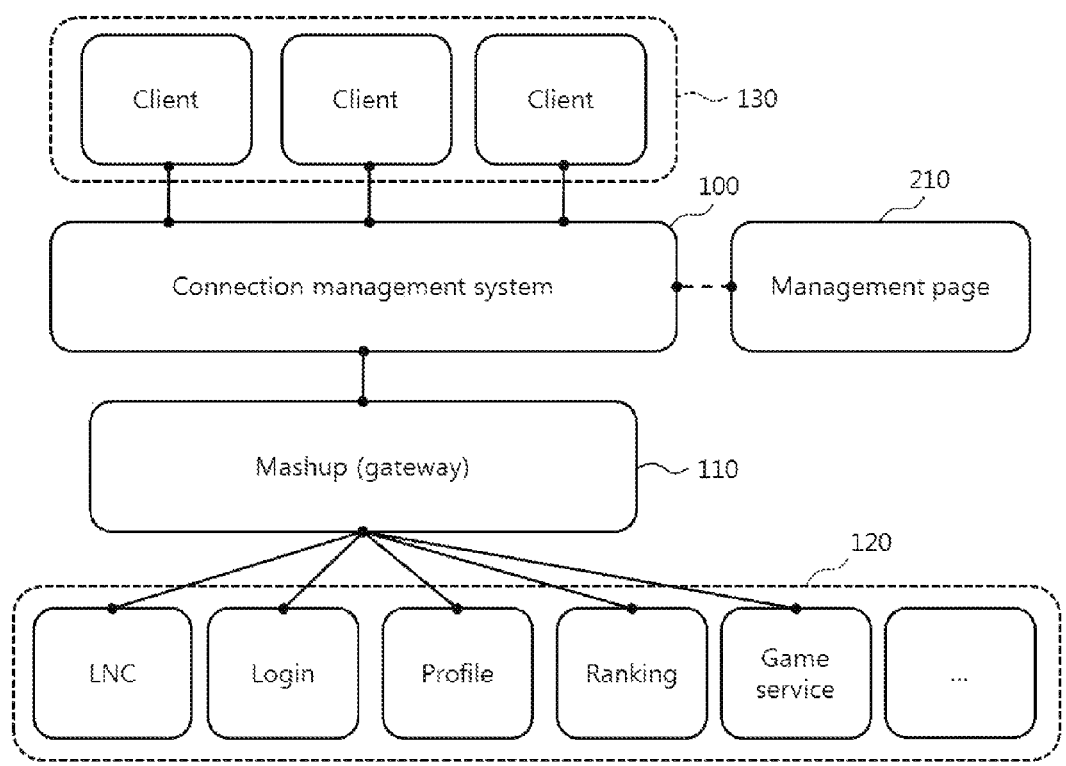
FIG. 2 illustrates another example of a connection management system according to embodiments of the present disclosure.

FIG. 1 illustrates an example of a connection management system 100 according to embodiments of the present disclosure, and FIG. 2 illustrates another example of the connection management system 100 according to embodiments of the present disclosure. The connection management system 100 refers to a server to which a device initially connects in order to use a service and may be, for example, a reserve proxy. The connection management system 100 may manage connections between the device and a variety of services 120 associated with a local network center (LNC), a login, a profile, a ranking, market, and a payment through a mashup 110. Here, the mashup 110 may include a gateway, and each of the services 120 may include a server that provides a corresponding service.

FIG. 1 illustrates an example of connections between a client 130 or a game server 140 and the services 120. For example, referring to FIG. 1, when the client 130 is provided with a game service from the game server 140, the client 130 may be provided with a service, such as a login, a ranking, a profile, and a payment, through the connection management system 100. If the game service provided from the game server 140 is expanded overseas, the game server 140 and the connection management system 100 may be constructed overseas for each country. The domestically constructed services 120, such as a login and a ranking, and the game server 140 or the client 130 may be connected through the connection management system 100. In such a manner, initial construction cost may be saved. Also, FIG. 2 illustrates an example of providing the entire service by including a game service function of the game server 140 in the services 120 and by constructing only the connection management system 100 for each country in the case of overseas expansion.

To this end, the connection management system 100 may perform a variety of processing associated with a connection between a device and a service, for example message transmission and security such as authentication or authorization. For example, in a mobile environment, a wireless connection between a device and a service may be relatively unstable compared to a wired connection. Therefore, according to embodiments of the present disclosure, it is possible to process a connection with a device for login, security, and authorization level support through the connection management system 100. In detail, referring to FIG. 2, it is possible to stably process connections between the device and the services 120 by applying a stable wired connection to connections between the connection management system 100 and servers that provide the respective services 120.

Also, a login process may require a plurality of accesses and communications. However, according to embodiments of the present disclosure, a login process may be generally preprocessed by the connection management system 100 and a login process with the client 130 may be performed using only a one-time access, for example, a one-time wired connection to the connection management system 100 on the side of the services 120.

Also, in the related art, many authentication checks on the client 130 may cause an increased load. However, according to embodiments of the present disclosure, many processes for an authentication check may be preprocessed. For example, the connection management system 100 may control authentication and authorization. Accordingly, on the side of the services 120, the client 130 may be authenticated through a one-time authentication check with the connection management system 100.

In addition, a variety of protocols, for example, a web protocol, such as Web Socket and a hypertext transfer protocol (HTTP), and a message routing system (MRS) protocol may be employed for communication between the client 130 or the game server 140 and the connection management system 100. For example, a variety of protocols may be used in various forms, for example, a form of using only WebSocket or selectively using an HTTP. In contrast, an MRS protocol may be employed for communication between the connection management system 100 and the services 120. In this case, it is possible to support a web browser using WebSocket and to use transfer layer security (TLS) using WebSocket Secure (WSS).

Further, a management page 210 configured to manage the connection management system 100 is disclosed in FIG. 2. In this example, an HTTP may be employed for communication between the connection management system 100 and the management page 210.

Here, a geographical difference of a national unit may be present between a location of the connection management system 100 and locations of the servers that provide the respective services 120. For example, the servers that provide the respective services 120 may be constructed in Korea and the connection management system 100 may be constructed in the U.S.A. For expansion of a service to the U.S.A. market, an overseas service may be enabled by constructing only the connection management system 100 without a need to construct the entire system in the U.S.A.

Figure 3:
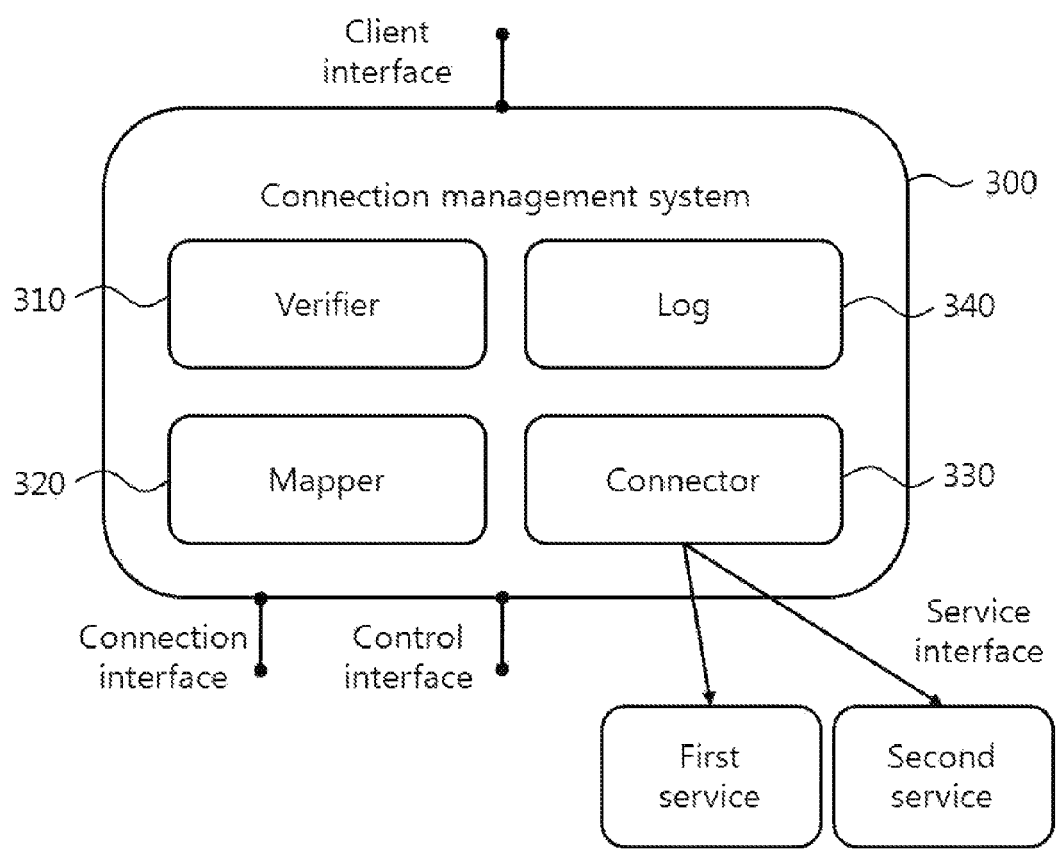
FIG. 3 illustrates a configuration of a connection management system according to embodiments of the present disclosure.

FIG. 3 illustrates a configuration of a connection management system 300 according to embodiments of the present disclosure. The connection management system 300 may correspond to the connection management system 100 of FIG. 1 or FIG. 2, and may include a verifier 310, a mapper 320, a connector 330, and a log 340. For example, the connection management system 300 may include at least one storage unit/storage configured to store at least one program and at least one processor. The verifier 310, the mapper 320, the connector 330, and the log 340 may be modules configured to operate the at least one processor according to a control of the at least one program.

The verifier 310 may verify a uniform resource identifier (URI) and a tag. For example, the tag may include an authentication tag and a service tag for tagging of a connection. When the connection management system 300 receives a request from a client, the verifier 310 may add tags for tagging of a connection to a header of a request message. In this instance, the verifier 310 may authenticate the client based on an authorization level of a service verified from a URI and an authorization level, for example, an authorization level of the authentication tag authorized to the client. The request from the client may be received by the connection management system 300 through a client interface.

The mapper 320 may map the request from the client and the service. For example, in response to the request message received from the client, the mapper 320 may verify a service to which the request message is to be transferred, and may map the request message and the service. In detail, the mapper 320 may search for the service corresponding to the request message and may map the request message and the service based on information on the service registered to the connection management system 300 and the URI of the request message. Information on the service registered to the connection management system 300 may include a URI and an address of a service, for example, an address of a server that provides the service by correlating the URI and the address of the service to each other, as expressed in Table 3. The connection management system 300 may be connected to the management page 210 of FIG. 2 through a control interface. An operator may register the service to the connection management system 300 through the management page 210, may install an application, for example, a hot deploy setting, or may monitor the connection management system 300.

The connector 330 may connect to a messaging service and may transfer the request from the client to the verified service. For example, the messaging service may refer to a service that uses an MRS protocol. FIG. 3 illustrates a "service interface" for communication between the connector 330 and services, for example, a first service and a second service. Also, the service interface of FIG. 3 may be used for a connection of a tag or pushing a message to the client in real time. The message push may be used, for example, to transfer a response message from the service.

The log 340 may selectively log at least one of a request and a response. The request or the response may be logged using a variety of methods, for example, an event, a database, and a local storage.

In addition to the functions described above with reference to FIG. 3, the connection management system 300 may include a function of inducing a reconnection to the client when a connection to the client is disconnected, a packet encryption function, and a plug-in function. Also, a client side may decrease a size of a distribution version by eliminating XBase dependency and thereby removing "XInNetwork".

Figure 4:
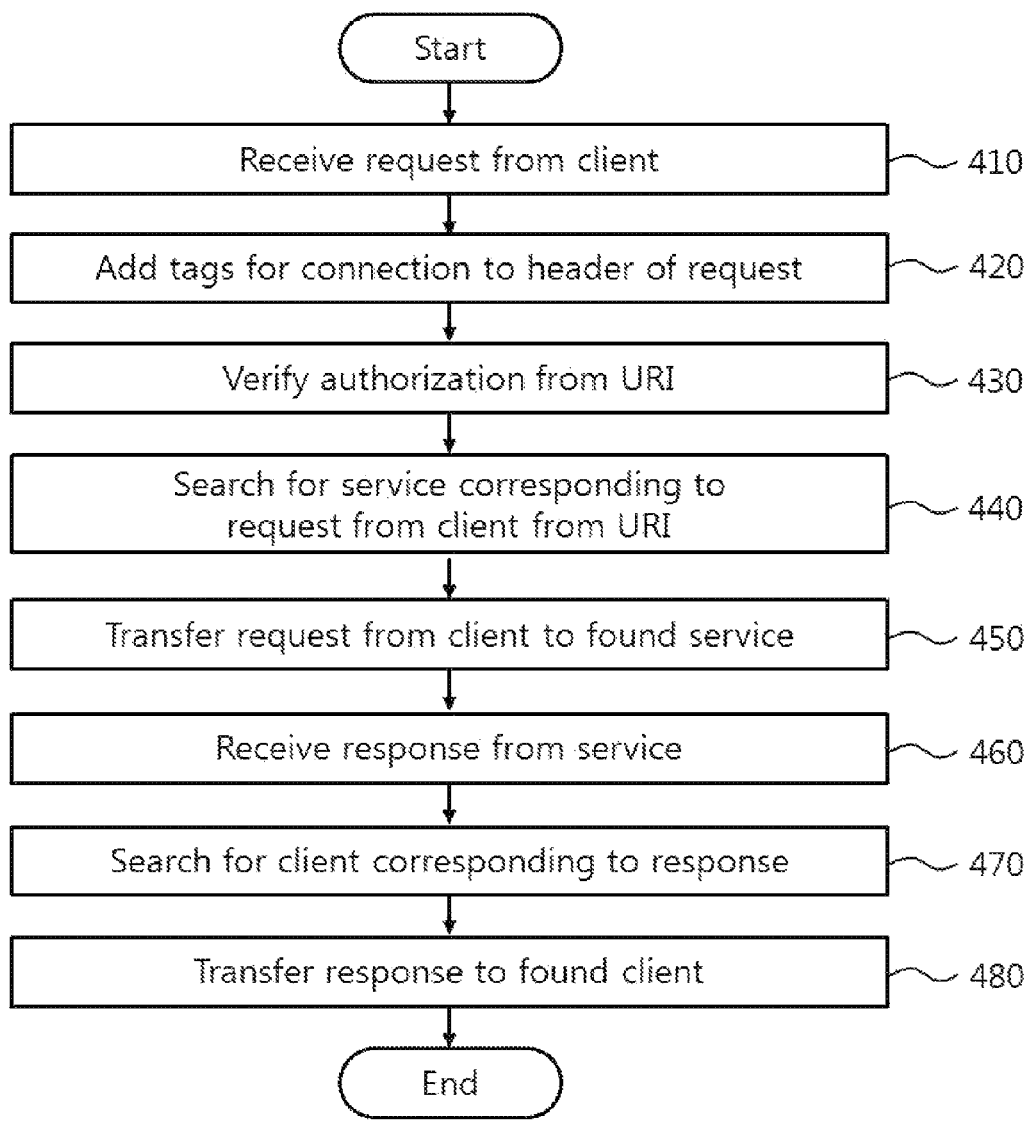
FIG. 4 is a flowchart illustrating a request and response process according to embodiments of the present disclosure.

FIG. 4 is a flowchart illustrating a request and response process according to embodiments of the present disclosure. The request and response process may be performed by a connection management system according to embodiments of the present disclosure. The connection management system may correspond to the connection management system 100 of FIG. 1 or 2, or the connection management system 300 of FIG. 3.

In operation 410, the connection management system may receive a request from a client. For example, the client may transmit a request message to the connection management system and the connection management system may receive the request from the client by receiving the request message.

In operation 420, the connection management system may add tags for a connection to a header of the request. For example, the connection management system may add tags, such as an authentication tag and a service tag, to the header of the request message.

In operation 430, the connection management system may verify an authorization using a URI. For example, the following Table 3 refers to an example of a service registration and shows that a URI and an authorization level are correlated to each other. The connection management system may verify the correlated authorization level using the URI. For example, the connection management system may verify whether to authorize the request from the client by comparing an authorization level included in an authentication tag of Table 2 to the authorization level of Table 3. When the request from the client is not authorized, the connection management system may transmit an error response to the client.

In operation 440, the connection management system may search for a service corresponding to the request from the client using the URI. For example, Table 3 shows that the URI and an address of the service are correlated to each other. The connection management system may search for the service corresponding to the request based on information on registered services as expressed by Table 3 and the URI.

In operation 450, the connection management system may transfer the request from the client to the found service. For example, the connection management system may transmit the request message of the client to an address of the found service.

In operation 460, the connection management system may receive a response from the service. For example, the connection management system may receive a response message transmitted from the service.

In operation 470, the connection management system may search for the client corresponding to the response.

In operation 480, the connection management system may transfer the response to the found client. For example, the connection management system may transmit a response message to the client.

Table 1 shows an example of an authorization level.

TABLE 1

| Authorization (authz) | Description |
|---|---|
| 90 | Root |
| 70 | A system is available. |
| 50 | An internal game server is available. |
| 30 | An external game server is available. |
| 20 | An ID Provider (IDP) login client is available. |
| 10 | A device login client is available. |
| 00 | Anonymous access is available. |

Table 1 shows that a security level increases according to an increase in an authorization level (authz).

Table 2 shows an example of an authentication tag for a connection.

TABLE 2

| Connection | Endpoint | Authentication (authn) | Authorization (authz) | Operating system number (osNo) | Game number (gameNo) |
|---|---|---|---|---|---|
| 3 | Client | 40100000352525 | 10 | 1(IOS) | 10031 |
| 4 | Client | 40100000352225 | 10 | 2(Android) | 101 |
| 5 | Server | 10.35.25.11:21332 | 50 | 0(server) | 10003 |
| 6 | Server | 10.35.29.59:1138 | 30 | 0(server) | 10009 |

As an example, authentication "40100000352525 (64 bits)", OS number "1(IOS)", and game number "10031" may be included in a request header or a response header of connection "3". As another example, authentication "10.35.25.11:21332 (64 bits)", OS number "0 (server)", and game number "10003" may be included in a request header or a response header of connection "5".

Here, a right of an authorization tag may be verified using a request URI. Table 3 shows an example of a service registration.

TABLE 3

| URI | Authorization (authz) | Messaging service | Address |
|---|---|---|---|
| /mashup_1_3/getPhoneNo | 30 | MRS | A:0:8201:0:0:0 |
| /mashup_1_3/getNickname | 70 | MRS | A:0:8202:0:0:0 |
| /mashup_1_4/getNickname | 70 | MRS | A:0:8301:0:0:0 |
| /Inc/getLncInfo | 90 | HTTP | 10.2.3.32:80 |
| /rank/getDefaultRankId | 70 | MRS | A:0:9000:0:0:0 |
| 191899482 | 70 | MRS | A:0:8204:0:0:0 |
| 96276026 | 70 | MRS | A:0:8204:0:0:0 |
| 228035530 | 70 | MRS | A:0:8204:0:0:0 |

Referring to Table 3, the URI and the authorization level are correlated to each other and thus, the right of the authorization tag may be verified using the URI.

Table 4 shows an example of a service (SVC) tag for a connection.

TABLE 4

| Connection | Service (SVC) | Value |
|---|---|---|
| 3 | mashup | mashup_tag_1 |
| 3 | rank | rank_tag_1 |
| 4 | rank | rank_tag_2 |
| 5 | rank | rank_tag_3 |

As an example, tag value "mashup_tag_1" for "SVC-mashup" and tag value "rank_tag_1" for "SVC-rank" may be included in a request header or a response header of connection "3". As another example, tag value "rank_tag_3" for "SVC-rank" may be included in a request header or a response header of connection "5". Here, a right of an SVC tag may be verified using a request URI.

According to embodiments, the connection management system may add tags, for example, an authentication tag (see Table 2) and a service tag (see Table 4), for a connection to a header of a request message. The authentication tag may include information for authenticating a user and information for authorizing an access. Here, the connection management system may verify an address of a service, for example, "A:0:8201:0:0:0" of Table 3 and an authorization level, for example, "30 (authz)", of Table 3 using a URI, for example, "/mashup_1_3/getPhoneNo" of Table 3, of the service included in the request message. For example, when the client is a "server" corresponding to connection "6" of Table 2, an authorization level allowed to the client is "30" and thus, satisfies an authorization level "3" of the corresponding service. Accordingly, an access to the service may be allowed and the connection management system may transfer the request message to the corresponding service. On the other hand, when the client is a "client" corresponding to connection "3" of Table 2, an authorization level allowed to the client is "10" and thus, does not satisfy an authorization level "30" of the corresponding service. Accordingly, the connection management system may transmit an error response message to the client. Also, the connection management system may manage information on the authentication tag for each connection as expressed in Table 2 and may also manage information on the service tag for each connection as expressed in Table 4. In addition, the URI may include information on the service and the connection management system may verify a right of the service tag based on information on the service included in the URI and Table 4.

Figure 5:
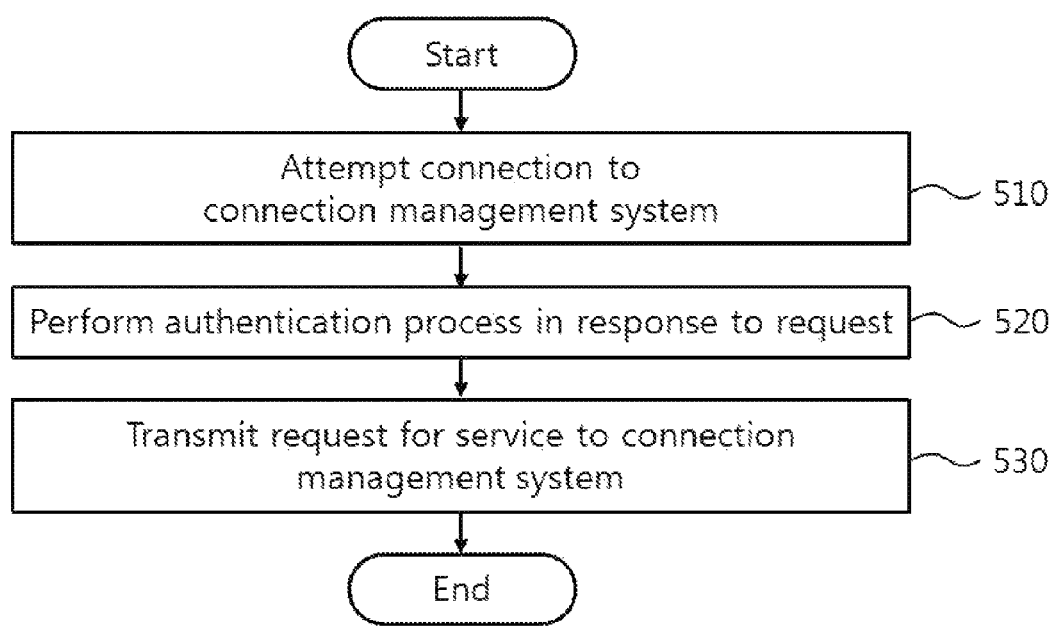
FIG. 5 is a flowchart illustrating an operation of a client according to embodiments of the present disclosure.

FIG. 5 is a flowchart illustrating an operation of a client according to example embodiments of the present disclosure.

In operation 510, the client may attempt a connection to a connection management system. For example, the client may attempt a connection to the connection management system using a protocol, such as a transmission control protocol (TCP). Here, the connection management system may allocate a socket for an MRS.

In operation 520, the client may perform an authentication process in response to the request. In this case, the connection management system may authenticate and authorize a tag.

In operation 530, the client may transmit a request for a service to the connection management system. Here, the connection management system may verify a URI, may search for a service handler for the request, may verify an authorization, and may transmit the request to the service.

Figure 6:
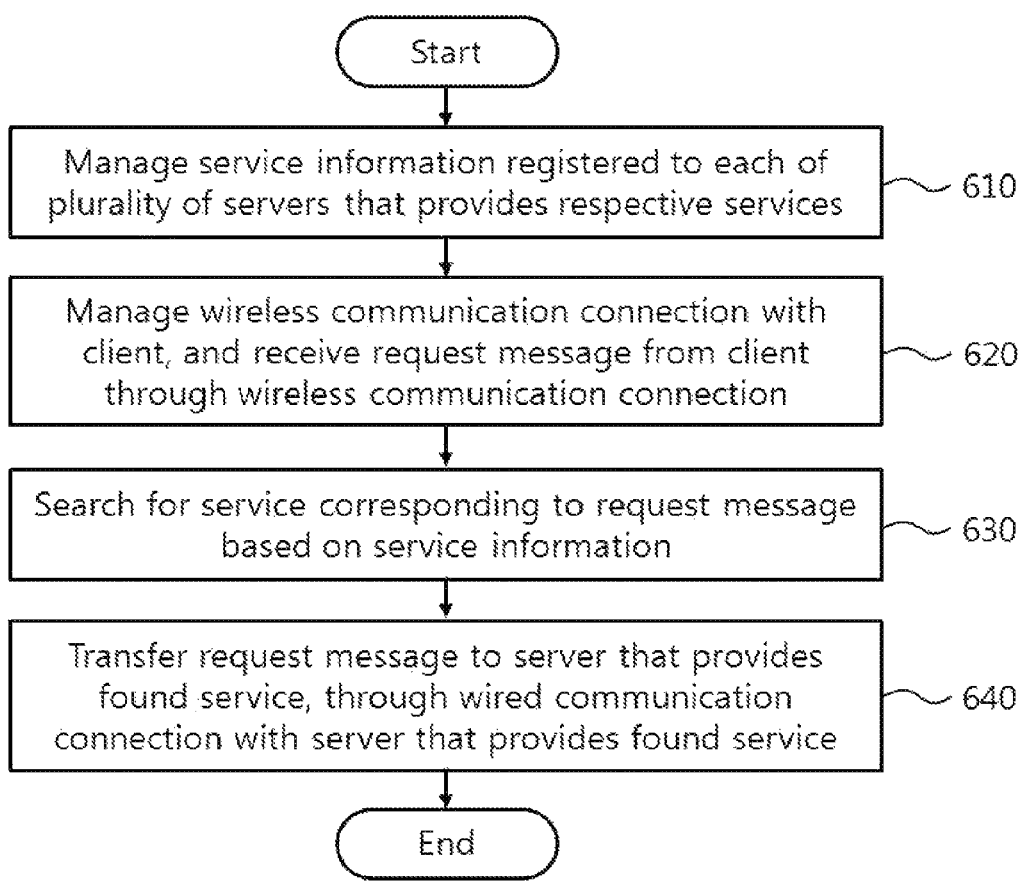
FIG. 6 is a flowchart illustrating a connection management method according to embodiments of the present disclosure.

FIG. 6 is a flowchart illustrating a connection management method according to embodiments of the present disclosure. The connection management method may be performed by a connection management system according to embodiments of the present disclosure. The connection management system may correspond to the connection management system 100 of FIG. 1 or 2, or the connection management system 300 of FIG. 3. The connection management system may include at least one storage unit/storage and at least one processor, and operations included in the connection management method may be performed by the at least one processor.

In operation 610, the connection management system may manage service information registered to each of a plurality of servers that provides the respective services. For example, the service information may be stored and managed in at least one storage unit included in the connection management system.

In operation 620, the connection management system may manage a wireless communication connection with the client, and may receive a request message from the client through the wireless communication connection. For example, when the wireless communication connection with the client is disconnected, the connection management system may transmit a reconnection request signal to the client in order to manage the wireless communication connection.

In operation 630, the connection management system may search for a service corresponding to the request message based on service information. An example of registered service information is described above with reference to Table 3. Further, as described above, the service corresponding to the request message may be found using a URI included in the request message.

In operation 640, the connection management system may transfer the request message to a server that provides the found service, through a wired communication connection with the server that provides the found service.

As described above, according to embodiments of the present disclosure, it is possible to provide an environment in which a client and a server that provides a service are stably connectable to each other by managing a wireless communication connection between a connection management system and the client in a mobile environment and by applying a wired communication connection to a connection between the connection management system and the server.

According to embodiments, in addition to operations 610 through 640 of FIG. 6, the connection management method may further include verifying an access authorization right to the service corresponding to the request message, based on service information. Here, although not illustrated, operation 640 may include determining whether access to the service corresponding to the request message is authorized, based on the access authorization right, and transferring the request message to the server that provides the found message when access is authorized. The aforementioned operations may be performed by the connection management system and may also be performed by at least one processor included in the connection management system.

According to embodiments of the present disclosure, in the case of overseas expansion of a service, it is possible to provide the service by constructing only a connection management server corresponding to a front end server for each country, and by relaying an overseas client and the domestically constructed backend server through the connection management server.

The features described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The above-described embodiments of the present disclosure may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present disclosure, or vice versa.

While certain embodiments and implementations have been described herein, other embodiments and modifications will be apparent from this description. Accordingly, the disclosure is not limited to such embodiments, but rather to the broader scope of the presented claims and various obvious modifications and equivalent arrangements.

What is claimed is:

1. A connection management method performed by a connection management system, the method comprising:
receiving a request message from a client device;
adding an authentication tag and a service tag for a connection to the request message;

verifying a right of the authentication tag and a right of the service tag using a uniform resource identifier (URI) of the request message;

searching for a service corresponding to the request message using the URI; and transferring the request message to the found service.

2. The method of claim 1, wherein the request message is transmitted to a server that provides the service, and
a national geographical difference is present between a location of the server and a location of the connection management system.

3. The method of claim 1, wherein the verifying of the right of the authentication tag and the right of the service tag comprises:
verifying the right of the authentication tag by comparing an authorization level of the authentication tag to an authorization level of information on a service registered to the connection management system; and
verifying the right of the service tag by comparing the service tag to a service tag included in the URI.

4. The method of claim 1, further comprising:
receiving a response message from the service to which the request message is transferred; and
transferring the response message to the client.

5. The method of claim 4, further comprising:
selectively logging the request message and the response message.

6. The method of claim 1, wherein the request message is authenticated at the service using the authentication tag.

7. The method of claim 1, wherein the URI is correlated with an authorization level.

8. The method of claim 7, further comprising:
verifying the correlated authorization level based on the URI.

9. The method of claim 7, wherein the authentication tag comprises an authorization level to be compared with the correlated authorization level.

10. Non-transitory computer-readable media storing a program, when executed by a processor, to perform:
receiving a request message from a client device;
adding an authentication tag and a service tag for a connection to the request message;
verifying a right of the authentication tag and a right of the service tag using a uniform resource identifier (URI) of the request message;
searching for a service corresponding to the request message using the URI; and
transferring the request message to the found service.

11. A connection management system, comprising:
storage configured to store at least one program; and
at least one hardware processor,
wherein the at least one hardware processor is configured to perform, according to control of the at least one program:
a process of receiving a request message from a client device;
a process of adding an authentication tag and a service tag for a connection to the request message;
a process of verifying a right of the authentication tag and a right of the service tag using a uniform resource identifier (URI) of the request message;
a process of searching for a service corresponding to the request message using the URI; and
a process of transferring the request message to the found service.

12. The connection management system of claim 11, wherein the request message is transmitted to a server that provides the service, and
a national geographical difference is present between a location of the server and a location of the connection management system.

13. The connection management system of claim 11, wherein to perform the process of verifying the right of the authentication tag and the process of the service tag, the at least one processor is configured to further perform:
a process of verifying the right of the authentication tag by comparing an authorization level of the authentication tag to an authorization level of information on a service registered to the connection management system; and
a process of verifying the right of the service tag by comparing the service tag to a service tag included in the URI.

14. The connection management system of claim 11, wherein the URI is correlated with an authorization level.

15. The connection management system of claim 14, further comprising:
verifying the correlated authorization level based on the URI.

16. The connection management system of claim 14, wherein the authentication tag comprises an authorization level to be compared with the correlated authorization level.

17. A connection management system, comprising:
a hardware processor configured to add an authentication tag and a service tag to a request message received from a client device, to verify a right of the authentication tag and a right of the service tag using a uniform resource identifier (URI) of the request message, and to map the request message and a service using the URI; and
a connector configured to transfer the request message to the mapping service.

18. The connection management system of claim 17, wherein the connector is configured to receive a response message to the request message from the service, and comprises a log configured to selectively log the request message and the response message.

19. The connection management system of claim 17, wherein the request message is transmitted to a server that provides the mapping service, and
a national geographical difference is present between a location of the server and a location of the connection management system.

* * * * *